March 15, 1960  H. J. CHRISTOFFERSEN ET AL  2,928,760
APPARATUS FOR CONTINUOUS LIXIVIATION
Filed Dec. 3, 1954

INVENTORS
Hans J. Christoffersen
Christian M. Möller

BY Watson, Cole, Grindle & Watson
ATTORNEYS

United States Patent Office 2,928,760
Patented Mar. 15, 1960

2,928,760

APPARATUS FOR CONTINUOUS LIXIVIATION

Hans Jacob Christoffersen and Christian Marius Möller, Nakskov, Denmark

Application December 3, 1954, Serial No. 472,998

Claims priority, application Denmark December 8, 1953

2 Claims. (Cl. 127—7)

The invention relates to an apparatus for the continuous counter-current lixiviation of a disintegrated material, e.g. sugar cossettes, being penetrable to the lixiviating agent and not soluble in same, and more especially the invention relates to an apparatus of the kind referred to, comprising a substantially vertically disposed cylindrical lixiviating chamber having at the top end an inlet for the disintegrated material and an outlet for the yield of extract and comprising a rotary screw conveyor extending longitudinally through the lixiviating chamber and arranged to be rotated about the axis of same to convey the disintegrated material downwardly through the lixiviation chamber and further comprising a pressing chamber arranged in continuation of the lixiviating chamber at the bottom end of same, from which pressing chamber the lixiviated disintegrated material in a compacted state is discharged preferably in a downward direction.

The hitherto known apparatus of the kind referred to suffer from the drawback that the lixiviating agent being fed into the apparatus through an inlet at the level of the said pressing chamber ascends substantially in a vertical direction through the lixiviating chamber without being forced to substantially follow the helical path bounded between the helical blade of the said screw conveyor and the interior surface of the cylindrical wall of the lixiviating chamber. As a consequence of this circumstance, the degree of lixiviation, which means the yield of extract to be obtained from a certain amount of disintegrated material, in any previously proposed apparatus of the kind referred to has not been satisfactory.

The purpose of the present invention is to provide for an increase in the degree of lixiviation and consequently in the yield of extract to be obtained from a certain amount of disintegrated material in an apparatus of the kind referred to, and to this end, in an apparatus according to the invention the windings of the screw conveyor located in the lexiviating chamber are arranged to fit closely against the inner cylindrical face of the wall of the lixiviating chamber so as to leave between said wall and their circumference a very narrow annular space only, just sufficient to allow the screw conveyor which occupies substantially the complete free passage area of said chamber, to freely rotate along said wall.

In an apparatus arranged in this manner the lixiviating agent being fed to the lixiviating chamber at the level of the pressing chamber would when caused to ascend through the lixiviating chamber be forced to substantially follow the helical path referred to above counter-current to the disintegrated material.

It has previously been proposed in an apparatus of the kind referred to to compress the lixiviating material in the pressing chamber communicating with the bottom end of the lixiviating chamber by means of a separate pressing screw being rotatably mounted centrally in the pressing chamber and arranged to compact the lixiviated disintegrated material to such a state that the remainder of extract contained in the said material when leaving the lixiviating chamber is squeezed out, the said material forming in the compacted state a bottom plug in the discharge passage through which the pressing worm causes the compacted material to leave the pressing chamber. The said remainder of extract is caused to mix with the fresh lixiviating agent, e.g. water, supplied to the lixiviating chamber at the level or substantially at a level of the upper region of the pressing chamber.

In order to secure a proper compactness of the lixiviated material when compacted by means of the said pressing worm, it has been proposed to arrange the pressing chamber with a downwardly tapering passage for the compacted material, to which end the pressing chamber is in the configuration of a hopper.

In the hitherto known apparatus of the kind referred to in which the pressing chamber tapers in a downward direction the said chamber has a relatively large extension in a vertical direction.

In a preferred modification of an apparatus according to the invention the pressing chamber has an annular passage area bounded between two watertight surfaces converging in a downward direction and an annular outlet passage for the lixiviated material. The pressing chamber is arranged between an upwardly tapering portion of a solid of revolution having a watertight surface and the cylindrical wall of an extension of the bottom end of the wall of the lixiviating chamber. The said solid is arranged in a central position within said extension and a conical upwardly tapering portion of said solid is fitted with helical blades for compacting the lixiviated material and to convey it downwardly in a compacted state through an annular outlet passage. The conveyor located in the pressing compartment is mounted in coaxial alignment to the conveyor located in the lixiviating chamber and the said two conveyors are arranged to be rotated independently of each other.

The lixiviation of organic material, among others, sugar cossettes, may be effectively performed only if the cells of said substances are killed, and as a rule this necessitates a heating of the material to be extracted, e.g. as far as sugar cossettes are concerned a heating to about 60–70° C. Now, since as a rule it is desirable that the lixiviated material when discharged from the apparatus has a substantially lesser temperature, the pressing chamber is in a preferred embodiment of an apparatus according to the invention provided with means for cooling the region of said chamber wherein the lixiviated material is formed into a bottom plug during the compacting operation.

In order to counteract the tendency of the disintegrated material to preferably rotate together with the conveying screw in the lixiviating chamber without being simultaneously displaced axially in a downward direction through the lixiviating chamber, an apparatus according to the invention may in a manner known per se be fitted with separate members arranged to offer some slight resistance to the rotative movement of the disintegrated material, and to this end the helical blade of the screw conveyor in the lixiviating chamber may according to the invention be divided up by narrow radially disposed incisions into a number of consecutive segments extending e.g. each over one or more windings of the helical blade. The radial incision between each two consecutive segments of the helical blades forms a narrow passage arranged to be open in the direction of rotation of the screw conveyor and each of the members referred to above consists of a thin rod disposed in the plane in rotation of one of said passages so as to extend transversely through the lixiviating chamber in the wall of which the said rods are supported. The thickness of any of said rods in the direction of the axis of the lixiviating chamber is slightly less than the axial width of said passage so as to allow the winding of the screw conveyor to freely rotate past said rods.

In order to prevent the lixiviating agent from flowing through to any essential degree through the said passages in the helical blade, the segments of the said blades may according to the invention be so arranged that adjacent ends of any pair of segments of the helical blades overlap one another so as to allow the lixiviating agent to flow past the interruption in the helical blades without penetrating same.

The accompanying drawing illustrates one example of construction of an apparatus in accordance with the invention:

Figure 1:
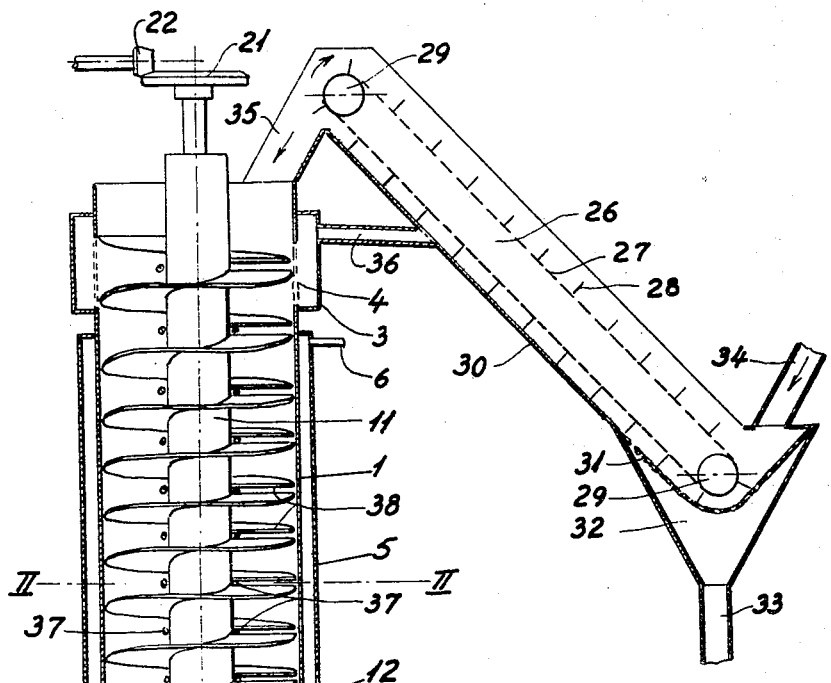
Fig. 1 is a diagrammatic vertical section view of the apparatus.
Figure 2:
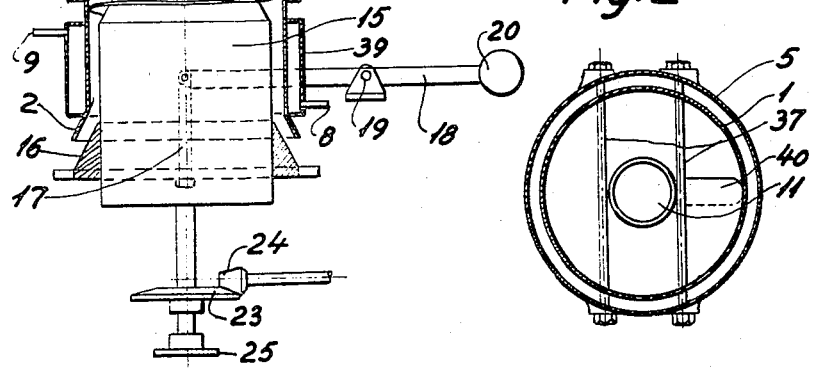
Fig. 2 is a cross-section view taken along line II—II of Fig. 1.

The numeral 1 designates a vertical cylinder within which a screw conveyor 11 is rotatably mounted in a central position. A pressing worm more especially referred to below and comprising a solid of revolution 14, 15 having a conical top portion 14 and a cylindrical bottom portion 15 is arranged as a continuation of the lower end of said screw. The diameter of the cylindrical portion 15 of said solid of revolution is a little smaller than the interior diameter of the portion of the cylinder 1 surrounding said cylindrical portion 15.

The apparatus shown on the drawing is adapted to serve the purpose of lixiviating sugar cossettes, which are supplied to the cylinder 1 at the upper end of same by means of a conveyor 26 to which the cossettes are delivered from a cutting machine, not shown, through an inlet channel 34. The conveyor 26 comprises an endless chain 27, running over chain wheels 29. The said chain is provided with cams or catching members 28 and serves the purpose of conveying the cossettes to a level above the top end of the cylinder 1 into which the cossettes drop along a guideway 35. The lixiviating agent, e.g. water, is supplied to the bottom end of the cylinder 1 through an inlet pipe 10 being preferably arranged to supply said agent to the region of the interior of the cylinder 1 which is located between or immediately above the conical portion 14 of the body 14, 15 and the wall of the cylinder 1. The said region forms a pressing chamber in which the lixiviated disintegrated material is subjected to a compression, as more especially referred to below.

The extract obtained by the lixiviating process rises through the cylinder 1 and is discharged from same through an overflow pipe 36 arranged at the top end of the cylinder 1 and terminating into an aperture in the bottom of the trough or tray 30 of the conveyor 26, from which aperture the extract having entered the tray 30 flows along the inclined bottom face of same to a perforated bottom portion 31 of the tray 30, through which perforate bottom portion the extract flows down into a hopper 32 from which the extract is discharged through a pipe 33.

A top portion 4 of the wall of the cylinder 1 is perforated and surrounded by a jacket 3 through which the extract having left the interior of the cylinder 1 through the perforated portion 4 flows to the overflow pipe 36.

The screw conveyor 11 is rotated by a suitable motor, not shown, by way of a bevel gear system comprising bevel wheels 21 and 22. The pressing worm 14, 15 is by means of a further bevel-gear system 23, 24 rotated independently of the screw conveyor 11, and the ends of said worm and said screw facing one another are guided in a bearing 12 which is maintained in central position by means of bolts or rods 13 supported by the cylinder 1. The pressing worm is supported by a step-bearing 25.

The disintegrated material supplied to the lixiviating chamber would, when the screw conveyor 11 is rotated, be conveyed downwardly through the cylinder and is prevented from rotating together with the said screw conveyor without being simultaneously displaced in the direction of the axis of the screw conveyor by means of rod-shaped resistance members 37 arranged transversely of the axis of rotation of the screw conveyor at the level of radially disposed incisions 38 arranged at spaced intervals in the windings of the helical blade of the screw conveyor 11. As an example, the said incisions 38 may be arranged at a mutual distance in direction of the axis of the screw corresponding to the full pitch of the screw.

The circumferential edge of the windings of the helical blade of the screw conveyor fit so closely against the wall of the cylinder 1 as possible with due regard to the free rotation of the screw conveyor relatively to said wall, and as a consequence of this arrangement, the lixiviating agent which is supplied to the apparatus through the pipe 10 will when rising through the lixiviating chamber be forced to substantially follow the windings of the screw conveyor 11 which means to flow through the helical path bounding between said windings and the interior surface of the cylinder 1.

The incisions 38 are arranged to represent narrow passages allowing the helical blade of the screw conveyor when rotated to pass the resistance member 37 referred to above. The thickness of the rod shaped members 37 is only slightly less than the axial width of said passages or incisions 38.

The ends of the segments of the helical blade of the screw conveyor 11 may be provided with extensions located in planes vertical to the axis of rotation, which extensions on adjacent ends of two consecutive segments are arranged to overlap one another in order to prevent the lixiviating agent from passing to any appreciable extent through the incisions 38.

The lixiviated material which is delivered by the screw conveyor 11 to the pressing chamber is compressed in said chamber by means of the pressing screw 14, 15 to form a bottom plug in an annular space between the cylindrical portion 15 of the pressing worm and the surrounding portion of the wall of the cylinder 1, which bottom plug prevents the liquid remainder of extract, which is squeezed out from the lixiviated material undergoing compaction by the worm 14, 15, from flowing down through the pressing chamber and consequently causes the said liquid to rise through the cylinder 1 together with the lixiviating agent supplied to the cylinder through the pipe 10.

Around the said annular outlet passage a cooling jacket is arranged. The cooling medium introduced in this jacket through a pipe 8 is discharged from the jacket through a discharge pipe 9. If a further cooling is desired, a cooling medium, e.g. cold water, may be introduced into the cylindrical portion 15 of the pressing worm which portion in this case should be a hollow member.

The lowermost end of the cylinder 1 is formed in the shape of a conical collar 2, and a conical ring 16 of triangular cross section, which is coaxial to the screw conveyor 11 and to the pressing worm, surrounds the lower end of the cylindrical portion 15 of the pressing worm 14, 15. Ring 16 may be moved to engage the collar 2 by means of a lever system 17, 18 including a weight 20 which serves the purpose of maintaining the ring 16 in an elevated position to keep the cylinder 1 closed at the lower end of same during the start of the operation of the apparatus while a preparatory supply of material to be lixiviated is introduced into the cylinder until a compression of lixiviated material in the pressing chamber has taken place. The counter pressure with which the material being pressed out through the annular aperture between the wall of the cylinder 1 and the cylindrical portion 15 of the pressing worm reacts upon the disintegrated material being continuously fed in the lixiviating chamber may be adjusted by adjustment of the position of the ring 16 or, more exactly, of the space between said ring and the collar 2.

Around the wall of the cylinder 1 a heating jacket 5 may be arranged in well known manner. Steam or any other appropriate heating medium is supplied to this jacket through a pipe 6. The condensation water or the heating medium used is discharged through a pipe 7.

The ring 16 may, if desired be divided into sections which are assembled by means of another ring.

As referred to above, the apparatus shown on the drawing and described above is adapted preferably to be used for the lixiviation of sugar cossettes, the said apparatus may, however, also be used for many other lixiviating purposes, e.g. for the lixiviation of organic materials containing oil and fat and for the lixiviation of medicinally active substances from materials of vegetable or animal origin and furthermore for the lixiviation of soluble salts contained in minerals.

We claim:

1. An apparatus for continuous counter-current lixiviation of disintegrated material insoluble in the lixiviating agent but penetrable thereby comprising a substantially vertically disposed, cylindrical lixiviation chamber, an outlet for said liquid and an inlet for the disintegrated material at the top end of said chamber, a screw conveyor centrally disposed in said chamber extending substantially the full length thereof, and substantially equal in diameter to the internal diameter of said chamber, said screw having narrow radial interruption therein with the ends of the screw portions adjacent said interruptions extended into overlapping relationship, whereby said conveyor constitutes an essentially continuous helical conveying surface extending substantially the full width of said chamber from substantially one end to the other, and defining a continuous helical passageway for the lixiviating agent extending through substantially the entire height of said chamber, stationary retarders mounted transversally of the axis of the revolution of the screw conveyor at the levels of said interruptions, an inlet for the lixiviating agent substantially at the bottom end of the lixiviation chamber, a pressing compartment located in coaxial alignment to the lixiviation chamber at the bottom end thereof in direct communication with said chamber and having a bottom outlet for the lixiviated material, a separate conveyor centrally disposed in said pressing compartment in coaxial alignment to the conveyor disposed in the lixiviating chamber and means for rotating said two conveyors independently of each other.

2. An apparatus according to claim 1 in which the pressing chamber has an annular outlet passage, the cross-sectional area of which decreases in a downward and lateral direction and is enclosed by liquid-unpenetrable walls.

References Cited in the file of this patent

UNITED STATES PATENTS

| | | |
|---|---|---|
| 706,669 | Kessler | Aug. 12, 1902 |
| 755,546 | Rak | Mar. 22, 1904 |
| 780,819 | Schwarz | Jan. 24, 1905 |
| 923,760 | Bock | June 1, 1909 |
| 1,372,891 | Mengelbier | May 29, 1921 |
| 1,409,797 | Thomycroft | Mar. 14, 1922 |
| 1,971,632 | Anderson | Aug. 28, 1934 |
| 2,468,720 | Silver | Apr. 26, 1949 |
| 2,602,761 | Hildebrandt | July 8, 1952 |
| 2,637,666 | Langen | May 5, 1953 |
| 2,645,589 | Langen | July 14, 1953 |
| 2,819,190 | Kather | Jan. 7, 1958 |

FOREIGN PATENTS

| | | |
|---|---|---|
| 831,830 | Germany | Feb. 18, 1952 |